(12) United States Patent
Kim et al.

(10) Patent No.: US 10,602,140 B2
(45) Date of Patent: Mar. 24, 2020

(54) METHOD AND DEVICE FOR FILTERING IMAGE USING FILTER BANK IN IMAGE CODING SYSTEM

(71) Applicant: LG Electronics Inc., Seoul (KR)

(72) Inventors: Chulkeun Kim, Seoul (KR); Junghak Nam, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 0 days.

(21) Appl. No.: 15/736,144

(22) PCT Filed: Feb. 2, 2016

(86) PCT No.: PCT/KR2016/001128
§ 371 (c)(1),
(2) Date: Dec. 13, 2017

(87) PCT Pub. No.: WO2016/204372
PCT Pub. Date: Dec. 22, 2016

(65) Prior Publication Data
US 2018/0176561 A1     Jun. 21, 2018

Related U.S. Application Data

(60) Provisional application No. 62/181,729, filed on Jun. 18, 2015.

(51) Int. Cl.
*H04N 19/117* (2014.01)
*H04N 19/82* (2014.01)
(Continued)

(52) U.S. Cl.
CPC ......... *H04N 19/117* (2014.11); *H04N 19/176* (2014.11); *H04N 19/182* (2014.11); *H04N 19/82* (2014.11); *H04N 19/85* (2014.11)

(58) Field of Classification Search
None
See application file for complete search history.

(56) References Cited

U.S. PATENT DOCUMENTS 9,143,803 B2* 9/2015 Karczewicz ............ H04N 19/46
2010/0329361 A1* 12/2010 Choi ................... H04N 19/176
                                                          375/240.29
(Continued)

FOREIGN PATENT DOCUMENTS

KR     20100136391 A     12/2010
KR     20110001990 A      1/2011
(Continued)

OTHER PUBLICATIONS

Tsai et al., "Adaptive Loop Filtering for Video Coding", Dec. 6, 2013, IEEE Journal of Selected Topics in Signal Processing, vol. 7, No. 6, pp. 934-945 (Year: 2013).*

*Primary Examiner* — James M Anderson, II
(74) *Attorney, Agent, or Firm* — Dentons US LLP

(57) ABSTRACT

A method for filtering a reconstructed picture performed by an encoding device, according to the present invention, comprises the steps of: deriving first filter information for a target region of a reconstructed picture; selecting one among the derived first filter information and a second filter information included in the filter bank; and performing filtering on the target region in the reconstructed picture on the basis of the selected filter information, wherein, if the first filter information is selected, the filter bank is updated, and if the second filter information is selected, a filter index may be transmitted to a decoder. According to the present invention, the filtering of a reconstructed picture on the basis of the filter bank may be efficiently performed, and the amount of data allocated to the transmission/reception of filter infor- (Continued)

mation is reduced therethrough, consequently enabling the increase of compression and coding efficiency.

11 Claims, 7 Drawing Sheets

(51) Int. Cl.
*H04N 19/85* (2014.01)
*H04N 19/182* (2014.01)
*H04N 19/176* (2014.01)

(56) References Cited

U.S. PATENT DOCUMENTS

2012/0275513 A1* 11/2012 Jeong ............... H04N 19/172
375/240.02
2013/0266059 A1   10/2013 Chong et al.

FOREIGN PATENT DOCUMENTS

| KR | 20110070823 A | 6/2011 |
| KR | 20130095279 A | 8/2013 |

\* cited by examiner

METHOD AND DEVICE FOR FILTERING IMAGE USING FILTER BANK IN IMAGE CODING SYSTEM

CROSS-REFERENCE TO RELATED APPLICATIONS

This application is the National Stage filing under 35 U.S.C. 371 of International Application No. PCT/KR2016/001128, filed on Feb. 2, 2016, which claims the benefit of U.S. Provisional Application No. 62/181,729 filed on Jun. 18, 2015, the contents of which are all hereby incorporated by reference herein in their entirety.

BACKGROUND OF THE INVENTION

Field of the Invention

The present invention relates to an image coding technology and, more particularly, to a method and apparatus for filtering an image using a filter bank in an image coding system.

Related Art

The need for images of high resolution and high quality has recently been increasing in various fields. As the resolution and quality of an image is improved, the amount of data in the image is also likewise increased.

Due to the increase in the amount of information, an apparatus with various performance and networks of various environments are emerging. With the emergence of an apparatus with diverse capabilities and networks of diverse environments, it has become possible to use the same content at varying levels of quality.

Specifically, due to the fact that the image quality that the terminal apparatus can support is diversified, and the network environment that is constructed becomes various, in some environments, images of general quality are used, while, in other environments, images of higher quality are available.

For example, a consumer who purchases video content from a mobile terminal may view the same video content on a larger screen and with a higher resolution using a large screen for home use.

In recent years, as broadcasts with high definition (HD) resolution are being served, many users are already becoming accustomed to high resolution, high quality images, etc. In addition to HDTV, service providers and users are paying attention to ultra high definition (UHD) or better services that have more than four times the resolution of HDTVs.

As a result, a reconstructed picture filtering method for enhancing subjective/objective image quality is required.

SUMMARY OF THE INVENTION

The present invention provides a method and apparatus for enhancing image coding efficiency.

The present invention also provides a method and apparatus for enhancing an objective/subjective image quality of a reconstructed picture.

Another object of the present invention is to provide a method and apparatus for filtering a reconstructed picture using a filter bank.

Yet another object of the present invention is to configure a filter bank by taking into consideration the characteristics of an image.

Further yet another object of the present invention is to apply a filter by taking into consideration the characteristics of an image.

In accordance with an embodiment of the present invention, there is provided a method of filtering a reconstructed picture which is performed by an encoding apparatus. The method includes the steps of deriving first filter information for a target region of a reconstructed picture, selecting one of the derived first filter information and second filter information included in a filter bank, and performing filtering on the target region within the reconstructed picture based on the selected filter information.

In this case, the step of selecting one of the derived first filter information and the second filter information included in the filter bank may include the steps of determining whether the second filter information having image characteristics identical with image characteristics for the target region included in the derived first filter information is present in the filter bank, and selecting one of the first filter information and the second filter information based on a rate-distortion (RD) cost if the second filter information is present.

In this case, each of the first filter information and the second filter information may include at least one piece of information of activity, a directional filter shape, a frame number and a filter coefficient. The image characteristics of the first filter information and the image characteristics of the second filter information may be determined based on the activity and direction included in the first filter information and the second filter information, respectively.

In this case, the method may further include the step of transmitting a filter index indicative of the index of the second filter information within the filter bank to a decoder if the second filter information has been selected.

In this case, the method may further include the steps of transmitting a filter bank-available flag to the decoder and transmitting a filter type flag when a value of the filter bank-available flag indicates 1. The filter index may be transmitted if a value of the filter type flag indicates 1.

In this case, the method may further include the step of updating the filter bank with the first filter information if the second filter information is not present.

In accordance with another embodiment of the present invention, a there is provided method of filtering a reconstructed picture performed by a decoding apparatus. The method includes the steps of receiving a filter type flag indicating whether filtering based on a filter bank is applied to a target region of a reconstructed picture, selecting filter information for the target region based on the filter type flag, and performing filtering on the target region within the reconstructed picture based on the selected filter information.

In accordance with yet another embodiment of the present invention, there is provided a decoding apparatus performing a reconstructed picture filtering. The decoding apparatus includes a reception unit receiving a filter type flag indicating whether filtering based on a filter bank is applied to a target region of a reconstructed picture and a filter unit selecting filter information for the target region based on the filter type flag, and performing filtering on the target region within the reconstructed picture based on the selected filter information.

In accordance with the present invention, efficient reconstructed picture filtering based on a filter bank can be performed. Accordingly, compression and coding efficiency can be improved because the amount of data allocated to the transmission/reception of filter information is reduced.

DESCRIPTION OF EXEMPLARY EMBODIMENTS

Figure 1:
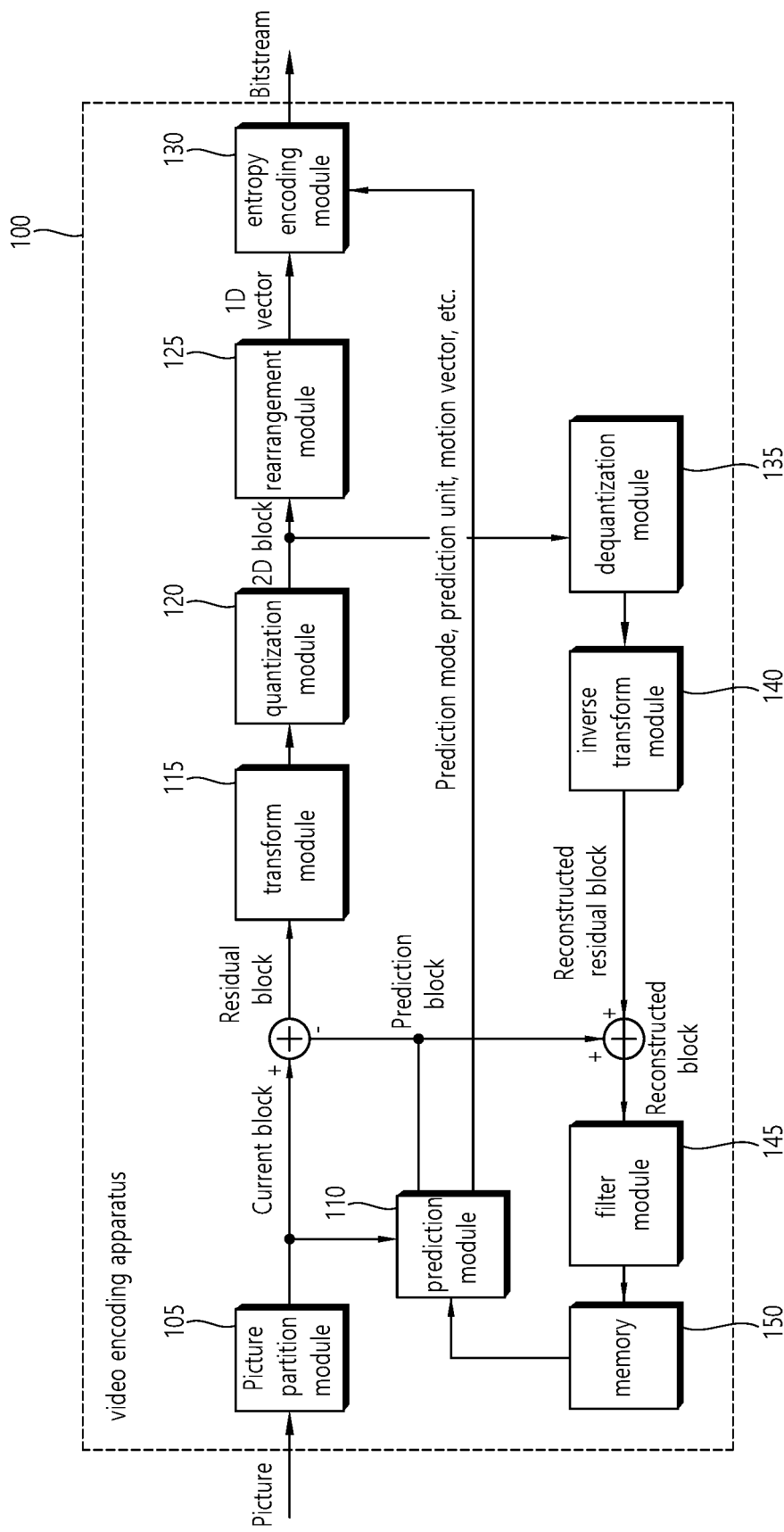
FIG. 1 is a block diagram schematically illustrating a video encoder according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the invention are independently drawn for the purpose of convenience for explanation of different specific functions in an image encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoder according to an embodiment of the invention.

Referring to FIG. 1, a video encoder 100 includes a picture partitioning unit 105, a prediction unit 110, a transform unit 115, a quantization unit 120, a rearrangement unit 125, an entropy encoding unit 130, a dequantization unit 135, an inverse transform unit 140, a filtering unit 145, and memory 150.

The picture partitioning unit 105 may be configured to split the input picture into at least one processing unit block. In this connection, a block as a processing unit may be a prediction unit PU, a transform unit TU, or a coding unit (CU). The picture may be composed of a plurality of coding tree units (CTUs). Each CTU may be split into CUs as a quad tree structure. The CU may be split into CUs having a deeper depth in a quad-tree structure. The PU and TU may be obtained from the CU. For example, the PU may be partitioned from a CU into a symmetric or asymmetric square structure. Further, the TU may be split into a quad tree structure from the CU.

The prediction unit 110 includes an inter prediction unit that performs an inter prediction process and an intra prediction unit that performs an intra prediction process, as will be described later. The prediction unit 110 performs a prediction process on the processing units of a picture divided by the picture dividing unit 105 to create a prediction block including a prediction sample or a prediction sample array. In the prediction unit 110, the processing unit of a picture may be a CU, a TU, or a PU. The prediction unit 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

The inter prediction may use a skip mode, a merge mode, or Advanced Motion Vector Prediction (AMVP). In the inter prediction, a reference picture may be selected for the PU, and a reference block corresponding to the PU may be selected. The reference block may be an integer pixel or sample unit, or a fractional pixel or sample unit. The prediction block is then generated for which the residual signal relative to the current PU is minimized and the motion vector size is minimized.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MDV, the motion vector predictor MVP, residual signal, etc., may be entropy encoded and then transmitted to the decoder. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. In this case, it may be determined whether a filter should be applied to a reference sample depending on the intra prediction mode and/or the size of a current block.

Residual values (a residual block or a residual signal) between the constructed prediction block and the original block are input to the transform unit 115. The prediction mode information, and the motion vector information, and the like used for the prediction are encoded along with the residual values by the entropy encoding unit 130 and are transmitted to the decoder.

The transform unit 115 performs a transform process on the residual block in the unit of TUs and creates transform coefficients.

A transform block is a rectangular block of samples and is a block to which the same transform is applied. The transform block may be a TU and may have a quad-tree structure.

The transform unit 115 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transform unit 115 may construct a transform block of transform coefficients through the transform.

The quantization unit 120 may quantize the residual values, that is, transform coefficients transformed by the transform unit 115, and may generate quantization coefficients. The values calculated by the quantization unit 120 may be supplied to the dequantization unit 135 and the rearrangement unit 125.

The rearrangement unit 125 may rearrange the transform coefficients supplied from the quantization unit 120. By rearranging the quantization coefficients, it is possible to enhance the encoding efficiency in the entropy encoding unit 130.

The rearrangement unit 125 may rearrange the quantized transform coefficients in the form of a two-dimensional block to the form of a one-dimensional vector through the use of a coefficient scanning method.

The entropy encoding unit 130 may be configured to entropy code the symbol according to a probability distribution based on the quantized transform values rearranged by the rearrangement unit 125 or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoder and passed to a decoder like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called the residual block in the block unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential Golomb, context-adaptive variable length coding (CAVLC), and context-adaptive binary arithmetic coding (CABAC) may be used for the entropy encoding. For example, the entropy encoding unit 130 may store therein a table for performing entropy encoding, such as a variable length coding/code (VLC) table. The entropy encoding unit 130 may perform entropy encoding using the stored VLC table. Further, the entropy encoding unit 130 derives a binarization method of a corresponding symbol and a probability model of a corresponding symbol/bin, and then performs entropy encoding using the derived binarization method or probability model.

The entropy encoding unit 130 may give a predetermined change to a parameter set or syntaxes to be transmitted, if necessary.

The dequantization unit 135 dequantizes the values transform coefficients quantized by the quantization unit 120. The inverse transform unit 140 inversely transforms the values dequantized by the dequantization unit 135.

The residual value or residual sample or residual sample array generated by the dequantization unit 135 and the inverse-transform unit 140, and the prediction block predicted by the prediction unit 110 may be combined to form a reconstructed block including a reconstructed sample or a reconstructed sample array.

In FIG. 1, a residual block and a prediction block are added to create a reconstructed block by an adder. In this case, the adder may be considered as a particular unit reconstructed block creating unit that creates a reconstructed block.

The filtering unit 145 applies a deblocking filter, an adaptive loop filter (ALF), a sample adaptive offset (SAO) to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

Meanwhile, the filtering unit 145 may not perform a filtering operation on the reconstructed block used in the inter prediction.

The memory 150 may store the reconstructed block or picture calculated by the filtering unit 145. The reconstructed block or picture stored in the memory 150 may be supplied to the prediction unit 110 that performs the inter prediction.

Figure 2:
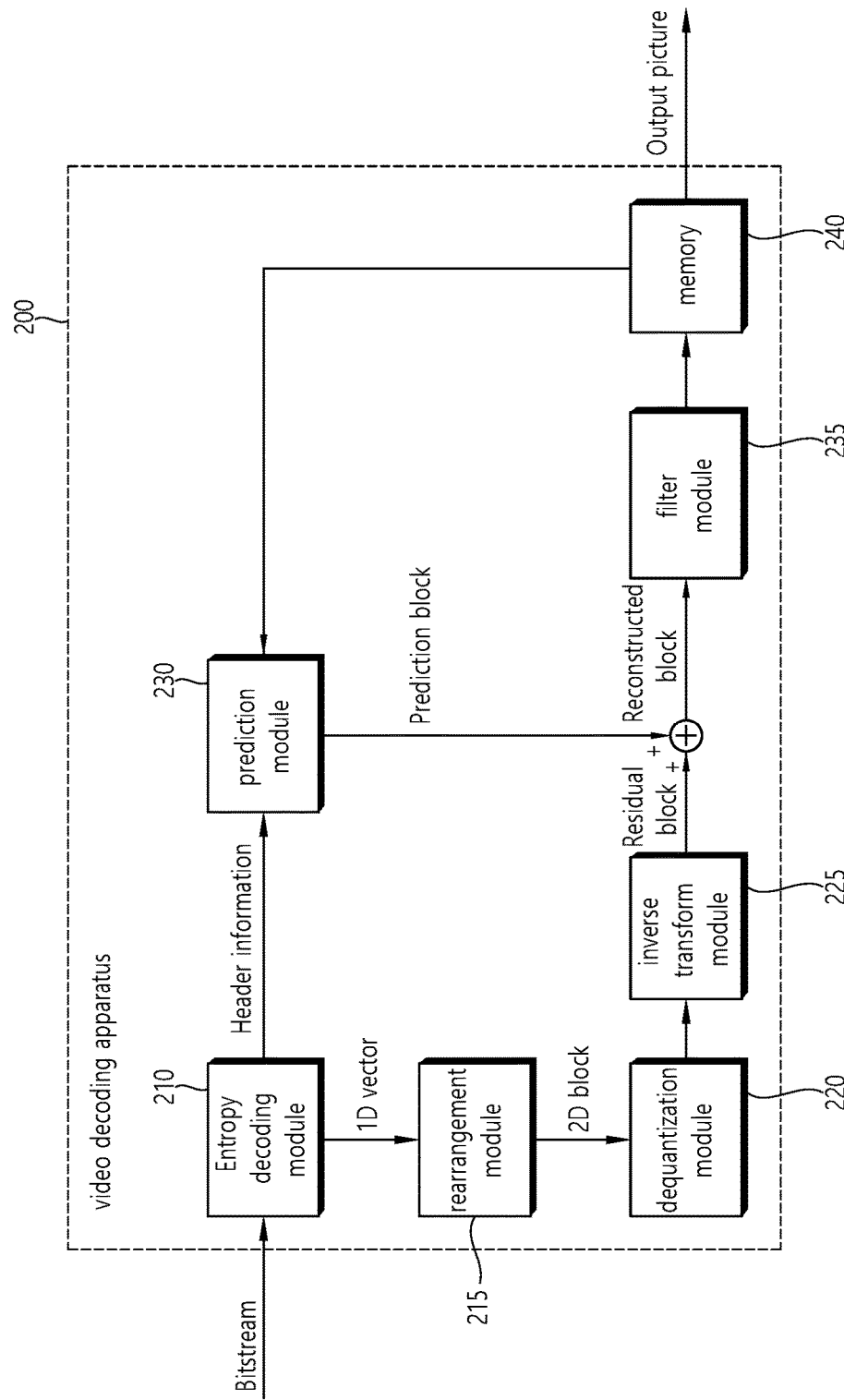
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 may include an entropy decoding unit 210, a rearrangement unit 215, a dequantization unit 220, an inverse transform unit 225, a prediction unit 230, a filtering unit 235, and a memory 240.

When a video bitstream is input from the video encoder, the input bitstream may be decoded on the basis of the order in which video information is processed by the video encoder.

The entropy decoding unit 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a variable length coding (hereinafter referred to as "VLC") such as CAVLC is used to perform entropy encoding in a video encoder, the entropy decoding unit 210 may perform decoding using the same VLC table as the encoder used in the encoder. Further, when CABAC is used to perform entropy encoding in a video encoder, the entropy decoding unit 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoding unit 210 may be supplied to the prediction unit 230, and the residual values, that is, the quantized transform coefficients, entropy-decoded by the entropy decoding unit 210 may be input to the rearrangement unit 215.

The rearrangement unit 215 may rearrange the bitstream information, that is, the quantized transform coefficients, entropy-decoded by the entropy decoding unit 210 on the basis of the rearrangement method in the video encoder.

The rearrangement unit 215 may reconstruct and rearrange the coefficients expressed in the form of a one-dimensional vector into coefficients in the form of a two-dimensional block. The rearrangement unit 215 may scan the coefficients on the basis of the prediction mode applied to the current block transform block and the size of the transform block and may create an array of coefficients quantized transform coefficients in the form of a two-dimensional block.

The dequantization unit 220 may perform dequantization on the basis of the quantization parameters supplied from the video encoder and the coefficient values of the rearranged block.

The inverse transform unit 225 may perform the inverse DCT and/or inverse DST of the DCT and/or DST, which has been performed by the transform unit of the video encoder, on the quantization result from the video encoder.

The inverse transform may be performed on the basis of a transfer unit or a partition unit of a picture determined by the video encoder. The transform unit of the video encoder may selectively perform the DCT and/or DST depending on plural information pieces such as the prediction method, the size of a current block, and the prediction direction, and the inverse transform unit 225 of the video decoder may perform the inverse transform on the basis of the transform information on the transform performed by the transform unit of the video encoder.

The prediction unit 230 generates a prediction block including a prediction sample or a prediction sample array based on the prediction block generation-related information provided by the entropy decoding unit 210 and the previously decoded block and/or picture information provided from the memory 240.

If the prediction mode for the current PU is the intra prediction mode, the prediction unit 230 may perform the intra prediction to generate a prediction block based on pixel information in the current picture.

If the prediction mode for the current PU is the inter prediction mode, the prediction unit 230 may be configured to perform inter prediction on a current PU based on information included in at least one picture of a previous picture or a subsequent picture to the current picture. In this connection, information about the motion information necessary for inter prediction of the current PU provided in the video encoder, such as motion vector and reference picture index may be deduced via checking the skip flag and merge flag received from the encoder.

The prediction unit 230 may generate a prediction block such that the residual signal relative to the current block is minimized and the motion vector size is minimized when inter prediction is performed on the current picture.

Meanwhile, the motion information derivation method may be changed according to the prediction mode of the current block. The prediction mode applied to inter prediction may include an advanced motion vector prediction (AMVP) mode, a merge mode, and the like.

For example, when a merge mode is applied, the encoding apparatus and the decoding apparatus may generate a merge candidate list using the motion vector of the reconstructed spatial neighboring block and/or the motion vector corresponding to the Col block which is a temporally neighboring block. In the merge mode, the motion vector of the candidate block selected in the merge candidate list is used as the motion vector of the current block. The encoding apparatus may transmit a merge index indicating a candidate block having an optimal motion vector selected from the candidate blocks included in the merge candidate list to the decoder. In this case, the decoder may derive the motion vector of the current block using the merge index.

In another example, when the AMVP mode is applied, the encoder and decoder generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoder may transmit to the decoder a prediction motion vector index indicating the optimal motion vector selected from among the motion vector candidates included in the motion vector predictor candidate list. In this connection, the decoder may select the prediction motion vector for the current block from the motion vector candidates included in the motion vector candidate list using the motion vector index.

The encoder may obtain the motion vector difference MVD between the motion vector for the current block and the motion vector predictor (MVP), encode the MVD, and transmit the encoded MVD to the decoder. That is, the MVD may be a value obtained by subtracting the MVP from a motion vector (MV) for the current block. In this connection, the decoder may decode the received motion vector difference, and derive the motion vector for the current block via addition between the decoded motion vector difference and the motion vector predictor.

Further, the encoder may transmit a reference picture index indicating a reference picture to the decoder.

The decoder may predict the motion vector of the current block using the motion information of the neighboring block and derive the motion vector of the current block using the residual received from the encoder. The decoder may generate the prediction block for the current block based on the derived motion vector and the reference picture index information received from the encoder.

In another example, when the merge mode is applied, the encoder and decoder may generate a merge candidate list using the motion information of the reconstructed neighboring block and/or the motion information of the Col block. That is, when the reconstructed neighboring block and/or the motion information of the Col block exists, the encoder and decoder may use the reconstructed neighboring block and/or the motion information of the Col block as a merge candidate for the current block.

The encoder may select a merge candidate that provides optimal encoding efficiency among the merge candidates included in the merge candidate list as the motion information for the current block. In this connection, a merge index indicating the selected merge candidate may be included in the bitstream which is transmitted to the decoder. The decoder may select one of the merge candidates included in the merge candidate list using the transmitted merge index, and the decoder may determine the selected merge candidate as motion information of the current block. Therefore, when the merge mode is applied, the motion information of the reconstructed neighboring block and/or the Col block may be used as the motion information for the current block as it is. The decoder may reconstruct the current block by adding the prediction block and the residual transmitted from the encoder to each other.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoder does not transmit syntax information such as the residual to the decoder in addition to information indicating which blocks motion information to use as the motion information for the current block.

The encoder and the decoder may generate a prediction block of the current block by performing motion compensation on the current block based on the derived motion information. In this connection, a prediction block may refer to a motion-compensated block as generated by performing motion compensation on the current block. Further, a plurality of motion compensated blocks may constitute a single motion compensated image.

The reconstructed block may be generated using the prediction block generated by the prediction unit 230 and the residual block provided by the inverse-transform unit 225. FIG. 2 illustrates that using the adder, the prediction block and the residual block are combined to generate the reconstructed block. In this connection, the adder may be viewed as a separate unit (a reconstructed block generation unit) that is configured to generate the reconstructed block. In this connection, the reconstructed block includes a reconstructed sample or a reconstructed sample array as described above; the prediction block includes a prediction sample or a prediction sample array; the residual block may include a residual sample or a residual sample array. Therefore, the reconstructed sample or the reconstructed sample array can be considered to be generated by combining the corresponding prediction sample or prediction sample array with the corresponding residual sample or residual sample array.

When the skip mode is used for a block, the residual signal may not be transmitted and the predicted block may be used as a reconstructed block.

The reconstructed block and/or picture may be supplied to the filtering unit 235. The filtering unit 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output unit.

The elements that is directly related to decoding images among the entropy decoding unit 210, the rearrangement unit 215, the dequantization unit 220, the inverse transform unit 225, the prediction unit 230, the filtering unit 235 and the memory 240 which are included in the decoding apparatus 200, for example, the entropy decoding unit 210, the rearrangement unit 215, the dequantization unit 220, the inverse transform unit 225, the prediction unit 230, the filtering unit 235, and so on may be expressed as a decoder or a decoding unit that is distinguished from other elements.

In addition, the decoding apparatus 200 may further include a parsing unit not shown in the drawing that parses information related to the encoded images included in a bitstream. The parsing unit may include the entropy decoding unit 210, and may be included in the entropy decoding unit 210. Such a parsing unit may also be implemented as an element of the decoding unit.

An in-loop filter may be applied to the reconstructed picture to compensate for a difference between an original picture and the reconstructed picture due to an error occurring in a compression coding process such as quantization, or the like. As described above, in-loop filtering may be performed in filter units of the encoder and decoder, and the filter units may apply a deblocking filter, a sample adaptive offset (SAO) and/or adaptive loop filter to the reconstructed image. Here, the ALF may perform filtering based on a value obtained by comparing the reconstructed picture with the original picture after the deblocking filtering and/or the SAO process is performed. The ALF may adaptively a Wiener filter to the reconstructed picture after the deblocking filtering and/or the SAO process is performed. That is, the ALF may compensate for an encoding error using the Wiener filter.

A filter (e.g., ALF) applied as a sample of a reconstructed picture may be determined based on a filter shape and a filter coefficient, for example. That is, the encoder and the decoder may perform filtering based on a filter shape and a filter coefficient.

The encoder may determine a filter shape and/or a filter coefficient through a specific process. In order to minimize an error generated in the compression encoding process, filtering may be applied. The encoder may determine a filter shape and/or a filter coefficient so that an error is minimized Information about the determined filter may be transmitted to the decoder. The decoder may determine a filter shape and/or a filter coefficient based on the transmitted information.

Meanwhile, a filter bank may be configured based on the characteristics of an image, and the best filter may be adaptively applied to a target region based on the filter bank. In this case, the encoder may transmit index information on the filter bank to the decoder. The decoder may obtain information about a filter applied to the target region based on the index information. Accordingly, the number of bits necessary to encode filter information can be reduced, and thus coding efficiency can be improved.

Table 1 shows an example of filter information which may be included in the filter bank according to the present invention.

TABLE 1

| Classification | Description |
| --- | --- |
| Activity | Indicate degree of texture/error |
| Direction | Indicate the direction of texture/degree |
| Filter Shape (Length) | Indicate of the shape/size of a filter |
| Frame Num. | Frame number to which a filter has been applied |
| Filter Coefficient | Filter coefficient information used |

Filter information according to the present invention may include at least one of the activity, direction, filter shape, frame number and filter coefficient. That is, the filter information may include a series of pieces of information and thus may be called a filter information set.

The activity indicates the characteristics of texture or error within a target region of a picture. For example, in a smooth background portion, an activity value has a low value. In contrast, in a complicated portion, an activity value has a high value. The activity value may be set as a value of a specific range through normalization or the original value itself may be used as the activity value. For example, assuming that a maximum value of an activity value is 100, the activity value may be normalized as 0~9, such as that values 0~10 are indicated by 0 and values 11~20 are indicated by 1, or the values of 0~100, that is, the original values, may be used without any change. Meanwhile, if normalization is performed, a range mapped for normalization may be equally/unequally set depending on importance. For example, if finer filtering is to be applied to a case including higher activity, values indicative of relatively low activity may be normalized as one value with respect to a relatively wide range (e.g., 20 unit), and values indicative of relatively high activity may be normalized as one value with respect to a relatively narrow range (e.g., 5 unit). In the present invention, the activity value may include the original value and a normalized value.

The direction indicates the directional characteristics of texture or error within a target region. For example, the direction may be horizontal, vertical or diagonal (right upward/left upward).

The activity and the direction may be derived based on sample points within a target region.

Figure 3:
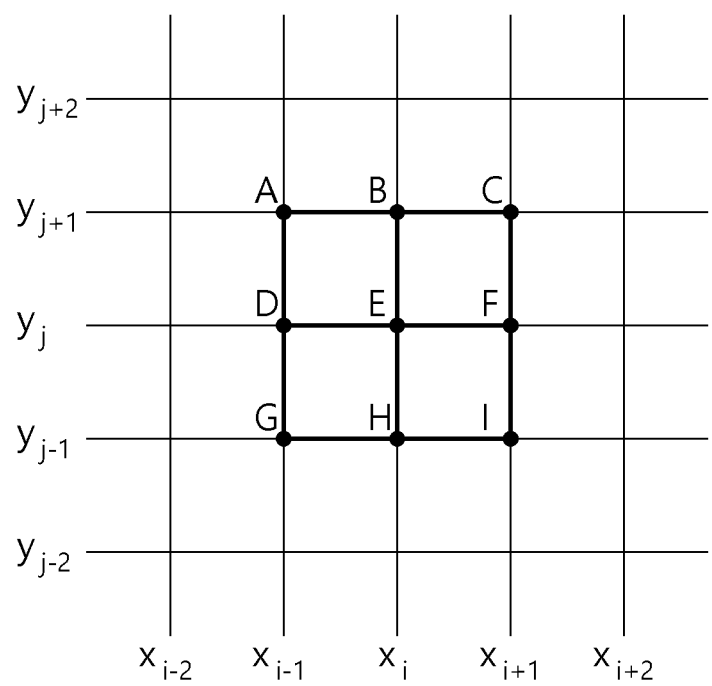
FIG. 3 illustrates a method of deriving the activity and direction of an image in accordance with an embodiment of the present invention.

FIG. 3 illustrates a method of deriving the activity and direction of an image in accordance with an embodiment of the present invention.

Referring to FIG. 3, a sample point E indicates a current sample point, and sample points A, B, C, D, F, G, H and I indicate sample points adjacent to the sample point E. A degree of a change in the vertical direction of E may be aware based on differences between the sample points E, and B and H, and a degree of a change in the horizontal direction of E may be aware using differences between the sample points E, and D and F. A degree of a change in the left upward diagonal direction may be aware using differences between the sample points E, and A and I, and a degree of a change in the right upward diagonal direction may be aware using differences between the sample points E, and C and G. The image characteristics of the sample point E may be calculated based on the degree of a change in the horizontal direction, the degree of a change in the vertical direction and the degree of a change in the diagonal direction. This may represent the complexity of an image, and the activity of the image in a target region may be derived based on the complexity of the image.

Furthermore, the direction of the image for the corresponding region may be obtained through a comparison between the degree of a change in the vertical direction, the degree of a change in the horizontal direction and the degree of a change in the diagonal direction.

Meanwhile, although the characteristics of the image have been calculated using the nine sample points in FIG. 3, the characteristics of an image may be calculated using greater or lesser sample points. For example, if five sample points are used, the sample points E, B, H, D and F may be used or the sample points E, A, C, G and I may be used.

The filter shape indicates the shape/size of a filter used. That is, one of a plurality of specific filter shapes may be selected for each target block. For example, in the case of the ALF, several filter shapes and sizes, such as an n×n star shape, an m×n cross shape and an m×n diamond shape, may be used. In this case, n and m are positive integers, and n and m may be the same or different.

The frame number indicates the frame number of a picture to which a corresponding selected filter has been applied. This may be used as information for managing a filter bank. For example, the frame number may be used to remove related filter information if a temporal distance is a specific distance or more when compared to the frame number of a current picture.

The filter coefficient indicates filter coefficient information used in a filter. The filter coefficient may include a plurality of coefficients and may be allocated according to criteria predetermined in the filter tab of a corresponding filter.

A filter bank according to the present invention indicates a set of pieces of filter information. That is, the filter bank may include a plurality of different types of filter information. For example, if three types of filter shapes are present and five activities and three directions are present, at least 45 pieces of filter information may be present. The encoder and the decoder manage a filter bank identically, and may perform filtering on a reconstructed picture efficiently using a piece of filter information within the filter bank.

Table 2 shows an example of a filter bank.

TABLE 2

| Filter Index | Activity | Direction | Filter Shape (or Length) | CU type | Filter Coefficient | Frame Num. |
| --- | --- | --- | --- | --- | --- | --- |
| 0 | 1 | 0 | 5 | Intra | | 0 |
| 1 | 1 | 1 | 7 | Intra | | 0 |
| 2 | 1 | 2 | 9 | Intra | | 0 |
| ... | ... | ... | ... | ... | ... | ... |
| 44 | 5 | 2 | 11 | Intra | | 3 |

In this case, the filter index indicates an index for classifying each piece of filter information within a filter bank. The encoder may notify the decoder of specific filter information based on the filter index.

The CU type indicates whether a CU including a filtering target region (e.g., a CU may become a target region or a block unit subdivided within a CU may become a filtering target region) has been encoded in an intra-prediction mode or an inter-prediction mode.

As described above, various values may be used as the filter coefficient in order to minimize an error generated in the compression encoding process. In this case, the expression of the various values has been omitted.

The encoder/the decoder may select a filter to be adaptively applied to a target region based on a filter bank. Furthermore, the encoder/the decoder may update the filter bank for more efficient filtering. For the filter bank update, at least one of the following managements may be performed.

1) When the number of pieces of filter information within a filter bank reaches a maximum value, an old filter is deleted. In this case, when the number of pieces of filter information within the filter bank reaches a maximum value, old filter information (e.g., filter information having the greatest frame number difference from the frame number of a current picture) of pieces of existing filter information may be deleted. Alternatively, when additional filter information is generated after the number of pieces of filter information within a filter bank reaches a maximum value, the oldest filter information of pieces of existing filter information may be deleted.

2) If new filter information having the same characteristics as existing filter information stored in a filter bank is generated, the existing stored filter information may be substituted with the new filter information. In this case, the same characteristics may mean that the activity and direction are the same or may mean that the activity, direction and filter shape (or size) are the same.

3) If new filter information having the same characteristics as existing filter information stored in a filter ban is generated, a filter coefficient within the existing stored filter information and a filter coefficient within the new filter information may be composed.

4) The size of a filter bank, that is, a maximum value of the number of pieces of filter information within a filter bank, may be limited or may not be limited. For example, if the size of a filter bank is limited, the size of the filter bank may be previously defined between the encoder/the decoder or the encoder may determine the size of the filter bank and signal it to the decoder. Meanwhile, if existing stored filter information is substituted with new filter information having the same characteristics, although the size of a filter bank is not limited, the size of the filter bank may be implicitly limited by the number of characteristics.

Figure 4:
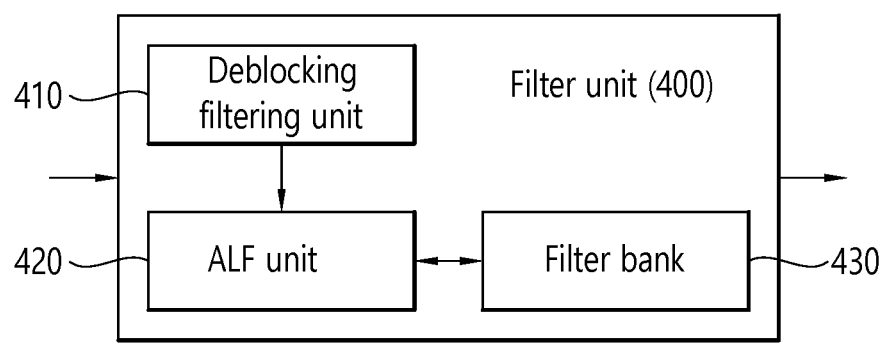
FIG. 4 is a conceptual diagram schematically showing a filter unit according to an embodiment of the present invention.

FIG. 4 is a conceptual diagram schematically showing a filter unit according to an embodiment of the present invention. The filter unit may be included in the encoding apparatus of FIG. 1 or may be included in the decoding apparatus of FIG. 2. FIG. 4 is described assuming that a unit that performs filtering according to the present invention is the ALF unit.

Referring to FIG. 4, the filter unit 400 includes an ALF unit 420 according to the present invention and a filter bank 430. Furthermore, the filter unit 400 may further include a deblocking filtering unit 410. Furthermore, although not shown, the filter unit 400 may further include an SAO unit. The filter unit 400 may perform filtering on a reconstructed picture by taking into consideration a difference between the original picture and the reconstructed picture. In this case, the ALF unit 420 may perform additional filtering on a reconstructed picture (or a modified reconstructed picture) on which a filtering procedure has been completed by the deblocking filtering unit 410 and/or the SAO unit.

The deblocking filtering unit 410 may deblocking-filter surrounding samples of a block boundary. The a block boundary may be a TU boundary and/or a PU boundary. That is, an error generated between blocks in a prediction and/or transform procedure may be modified through the deblocking filtering. In this case, the boundary strength (bS) of the block boundary is detected, and whether or not to perform deblocking filtering may be determined based on the bS. If the deblocking filtering is performed, whether or not to perform deblocking filtering on a chroma component in addition to a luma component may be determined.

The ALF unit 420 may adaptively apply ALF to a (modified) reconstructed picture after deblocking filtering and/or an SAO process has been completed. In this case, the ALF unit 420 may perform the ALF for each target region of the (modified) reconstructed picture unit.

The ALF unit 420 may generate filter information according to the present invention and update the filter bank 430 with the generated filter information. In this case, the update may include the storage, deletion and modification of the filter information. Furthermore, the ALF unit 420 may select (or extract) filter information about a target region from the filter bank 430.

Figure 5:
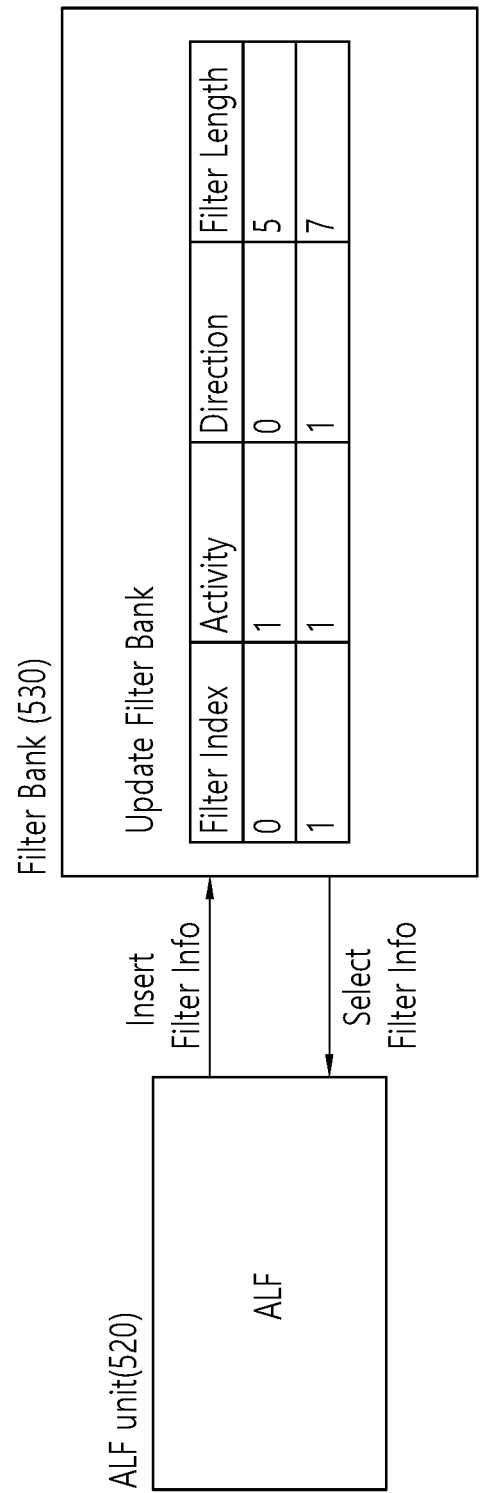
FIG. 5 is an example of an operation of an ALF unit and filter bank according to an embodiment of the present invention.

FIG. 5 is an example of an operation of the ALF unit and filter bank according to an embodiment of the present invention.

Referring to FIG. 5, an ALF unit 520 may insert new filter information into a filter bank 530 for update. The ALF unit 520 may select the filter information stored in the filter bank 530 and extract the selected filter information.

For example, the ALF unit 520 of the encoder stage may update the filter bank 530 with new filter information derived based on a rate-distortion (RD) cost with respect to a target region. The ALF unit 520 of the decoder stage may receive the new filter information from the encoder and update the filter bank with the received new filter information.

Furthermore, for example, the ALF unit 520 of the encoder stage may confirm whether the filter information derived with respect to the target region is present in the filter bank 530. If the corresponding filter information is present in the filter bank 530, the ALF unit 520 may select the corresponding filter information, may encode the filter index of the corresponding filter information within the filter bank 530, and may transmit the encoder filter index to the decoder. The decoder may select the filter information for the target region within the filter bank 530 of the encoder based on the filter index and extract the selected filter information. The ALF unit 520 may perform ALF based on the filter information.

Furthermore, if a picture (or frame) having the characteristics of instantaneous decoding refresh (IDR), the filter bank 530, pieces of filter information within the filter bank 530 may be initialized. That is, if a current picture is a picture having IDR characteristics, pieces of filter information within the filter bank 530 may be initialized.

The initialized filter bank (i.e., initial filter bank) may have been empty or pieces of predefined filter information may been present by default.

Figure 6:
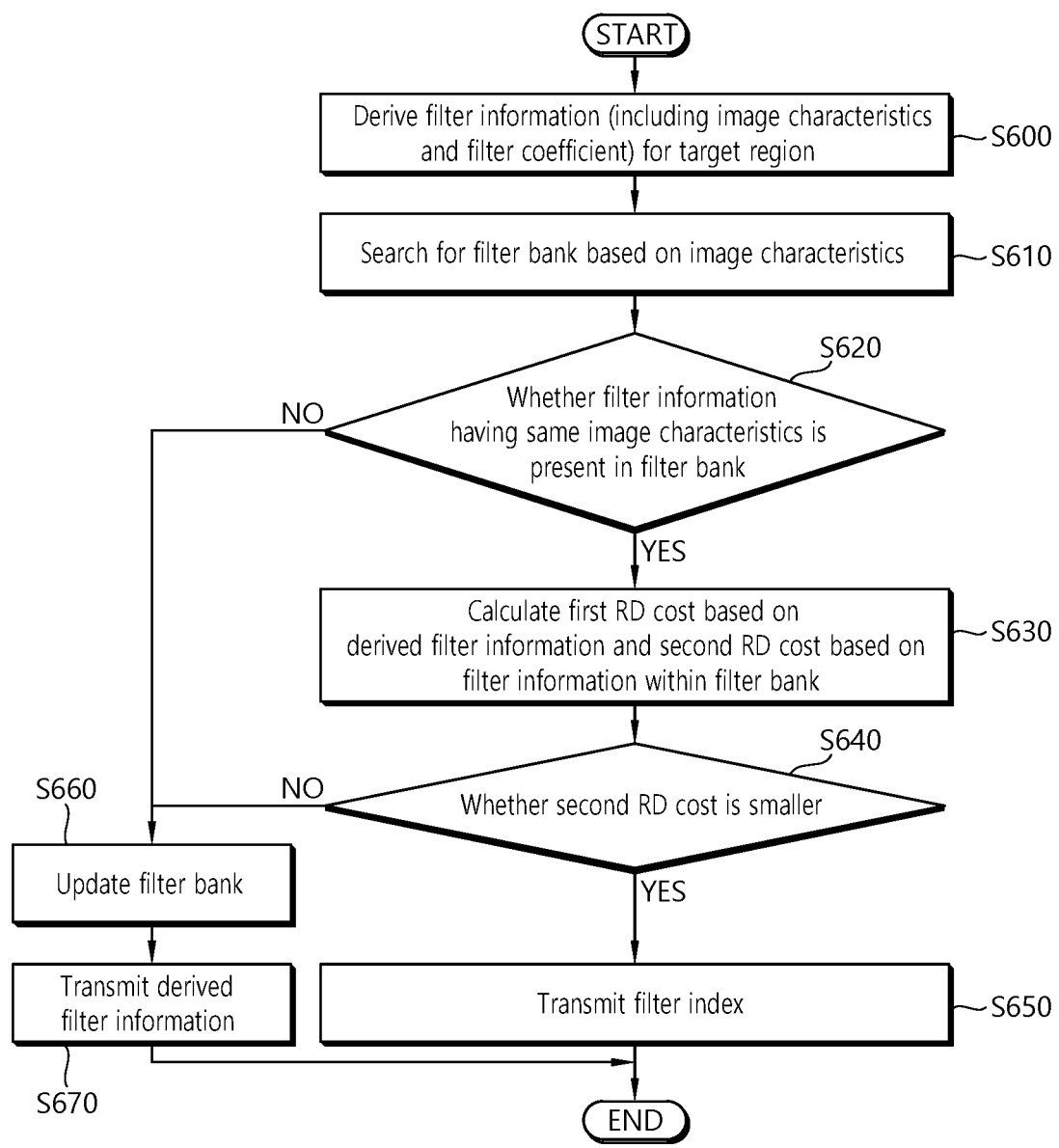
FIG. 6 is a flowchart schematically showing filter bank management and a method of filtering a reconstructed picture performed by the encoder.

FIG. 6 is a flowchart schematically showing filter bank management and a method of filtering a reconstructed picture performed by the encoder.

Referring to FIG. 6, the encoder derives filter information (S600). The encoder derives the filter information for a target region to which filtering is applied according to the present invention. The filter information includes image characteristics for the target region and a filter coefficient.

The image characteristics may include the activity and direction for the target region. The activity and the direction may be obtained based on a method, such as that described in FIG. 3, for example.

The encoder searches for a filter bank based on the image characteristics (S610), may compare the image characteristics, derived with respect to the target region, with the image characteristics of filter information stored in the filter bank, and may confirm whether filter information having the same image characteristics is present in the filter bank (S620). That is, the encoder confirms whether filter information having the same activity and direction as the activity and the direction within the derived filter information are present in the filter bank.

If filter information having the same image characteristics as the derived filter information is present in the filter bank at S620, the encoder calculates a first RD cost based on the derived filter information (first filter information) and calculates a second RD cost based on the filter information (second filter information) within the filter bank (S630). That is, the encoder calculates the first RD cost when filtering is performed based on the first filter information and the second RD cost when filtering is performed based on the second filter information.

The encoder determines whether the second RD cost based on the second filter information is relatively small (S640). That is, the encoder compares the second RD cost with the first RD cost and determines whether the second RD cost is smaller than the first RD cost.

If the second RD cost is smaller than the first RD cost at S640, the encoder selects the filter information (second filter information) within the filter bank, uses the selected filter information, generates filter index information (filter index) indicating that which filter information within the filter bank has been selected, and transmits the filter index information to the decoder (S650). In this case, frame number information within the second filter information may be updated with the frame number of a current picture.

Meanwhile, if filter information having the same image characteristics as the derived filter information is not present in the filter bank at S620, the encoder selects the derived filter information (first filter information) and update the filter bank with the selected filter information (S630). The encoder transmits the derived filter information (first filter information) to the decoder (S640).

Furthermore, if the second RD cost is greater than the first RD cost at S640, the encoder selects the derived filter information (first filter information) and updates the filter bank with the selected filter information (S630). The encoder transmits the derived filter information (first filter information) to the decoder (S640).

In this case, in updating the filter bank, the derived filter information (first filter information) may be inserted instead of the filter information (second filter information) stored in the filter bank.

The encoder may generate a filtered reconstructed picture by performing filtering on a reconstructed picture based on the first filter information or the second filter information. In this case, the reconstructed picture may indicate a reconstructed picture after deblocking filtering and/or an SAO procedure has been completed. The filtered reconstructed picture may be stored in memory (e.g., the decoded picture buffer (DPB)) and may be subsequently used as a reference picture in inter-prediction.

Meanwhile, although S630 has been illustrated as being performed earlier than S640 in FIG. 6, this is an example. S640 may be performed earlier than S630 or S640 and S630 may be performed at the same time.

Although the RD cost comparison has been performed on the filter information having the same image characteristics as the derived filter information within the filter bank in the embodiment of FIG. 6, this is only example. Although computational complexity is taken into consideration, an RD cost comparison based on all of pieces of filter information stored in the filter bank may be performed for coding efficiency improvement, and the best (i.e., lowest RD cost) filter information may be selected and used.

Meanwhile, although not shown, in order to perform the filtering procedure according to the present invention, a filter bank-available flag "filter_bank_enabled_flag" and/or a filter type flag "filter_type_flag" may be transmitted from the encoder to the decoder.

In this case, the filter bank-available flag indicates whether a filter bank is available or not. The filter bank-available flag is flag information indicating whether a filtering method based on a filter bank according to the present invention may be applied in a sequence, picture (or frame) or slice unit. If the value of the filter bank-available flag is 1, it indicates that the filter bank is available. If the value of the filter bank-available flag is 0, it indicates that the filter bank is not available. The filter bank-available flag may be signaled in a sequence level, picture (or frame) level or slice level.

The filter type flag indicates whether a filtering method based on a filter bank according to the present invention is used in the target region. For example, the filter type flag may be signaled only if the value of the filter bank-available flag is 1. If the value of the filter type flag is 1, it indicates that filtering based on the filter bank is applied to the target region. If the value of the filter type flag is 0, it indicates that filtering based on the filter bank is not applied to the target region. Alternatively, if the value of the filter type flag is 1, it may indicate that filtering is performed based on filter information within the filter bank. If the value of the filter type flag is 0, it may indicate that filtering is performed based on received filter information.

In this case, the target region may be a region having a specific size and may be a region according to a coding structure, such as a tile, a CTU or a CU. In this case, the tile may indicate a rectangular region having CTUs and may be a basic unit of parallel processing with respect to the encoder/the decoder having a multi-core structure. The filter type flag may be transmitted in a target region unit.

The filter type flag may be signaled in a target region unit and may also be signaled in a coding unit, such as a CU including the target region.

The filter bank-available flag, the filter type flag and the filter index may be transmitted to the decoder through a bitstream.

Figure 7:
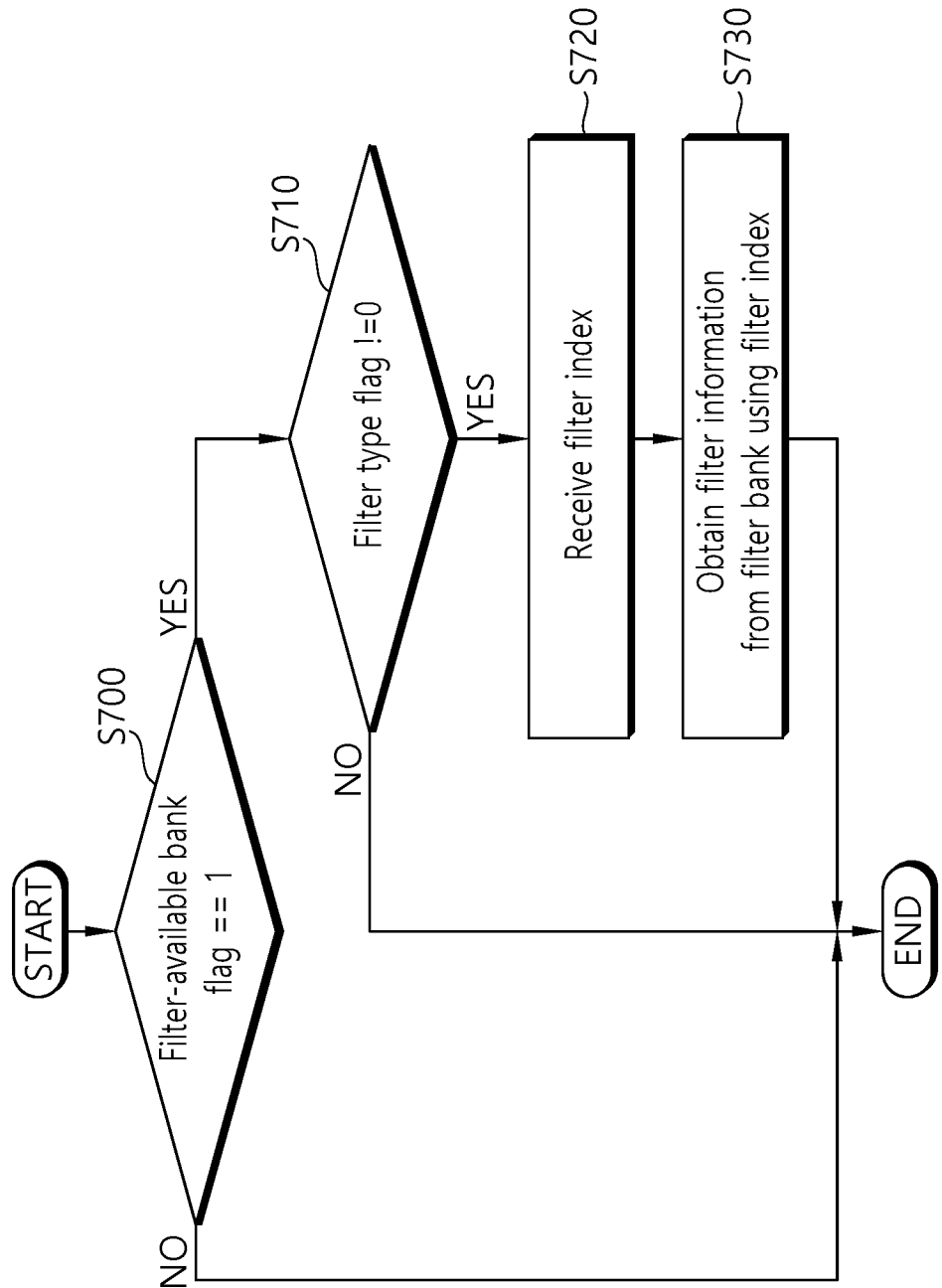
FIG. 7 is a flowchart schematically showing filter bank management and a method of filtering a reconstructed picture performed by the decoder.

FIG. 7 is a flowchart schematically showing filter bank management and a method of filtering a reconstructed picture performed by the decoder.

Referring to FIG. 7, the decoder receives a filter bank-available flag through a bitstream and determines whether the value of the filter bank-available flag indicates 1 (S700).

If the value of the filter bank-available flag indicates 1 at S700, the decoder receives a filter type flag through the bitstream and determines whether the value of the filter type flag is not 0 (S710).

If the filter type flag is not 0 at S710, the decoder receives (or parses) a filter index through the bitstream (S720). The filter index indicates the index of specific filter information that belongs to pieces of filter information included in a filter bank and that needs to be applied to a target region.

The decoder selects a specific filter bank in the filter bank using the filter index (S730). The decoder may perform filtering on a reconstructed picture based on the selected filter information. In this case, the reconstructed picture may indicate a reconstructed picture after deblocking filtering and/or an SAO procedure has been completed. The filtered reconstructed picture is stored in memory (e.g., the decoded picture buffer (DPB)) and may be output through an output device in order of output and used as a reference picture for inter-prediction.

Meanwhile, if the filter type flag is 0 at S710, the decoder does not use filter information stored in the filter bank. In this case, the decoder may not perform filtering on the target region or may perform filtering based on fixed filter information. Alternatively, the decoder may receive filter information through a bitstream from the encoder and perform filtering based on the received filter information. In this case, the decoder may update the filter bank based on the received filter information. In this case, if filter information having the same image characteristics (i.e., activity and direction) as the image characteristics of received filter information has been stored in the filter bank, the decoder may substitute the stored filter information with the received filter information.

In accordance with the present invention, efficient reconstructed picture filtering based on a filter bank can be performed. Accordingly, compression and coding efficiency can be improved because the amount of data allocated to the transmission/reception of filter information is reduced.

The above description is only illustrative of the technical idea of the present invention. Therefore, those skilled in the art may make various modifications and variations to the above description without departing from the essential characteristics of the present invention. Accordingly, the embodiments disclosed herein are intended to be illustrative, not limiting, of the present invention. The scope of the present invention is not limited by these embodiments. The scope of protection of the present invention should be construed according to the following claims.

When the embodiments of the present invention are implemented in software, the above-described method may be implemented by the module (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing apparatus. The memory may include read-only memory (ROM), random access memory (RAM), a flash memory, a memory card, a storage medium and/or other storage devices.

What is claimed is:

1. A method of filtering a reconstructed picture, the method being performed by an encoding apparatus and comprising steps of:
    deriving filter information for a target region of a reconstructed picture;
    selecting current filter information among of the derived filter information and candidate filter information included in a filter bank based on a comparison of the derived filter information and the candidate filter information;
    performing filtering on the target region within the reconstructed picture based on the current filter information, and
    encoding one of explicit filter information specifying the derived filter information or filter index information representing the candidate filter information in the filter bank based on the result of the selection,
    wherein the step of selecting the current filter information comprises a step of determining whether the candidate filter information having a filter shape and image characteristics identical with a filter shape and image characteristics of the derived filter information is present in the filter bank,
    wherein the image characteristics includes information of activity and direction of samples within the target region,
    wherein the information of activity and direction are derived based on at least one of a degree of a change of sample values in horizontal direction, a degree of a change of sample values in vertical direction, and a degree of a change of sample values in diagonal direction within the target region,
    wherein when the candidate filter information in the filter bank has the filter shape and the image characteristics identical with the filter shape and the image characteristics of the derived filter information, the filter index information representing the candidate filter information in the filter bank is encoded, and
    wherein when there is no candidate filter information in the filter bank that has the filter shape and the image characteristics identical with the filter shape and the image characteristics of the derived filter information, the explicit filter information specifying the derived filter information is encoded, and the filter bank is updated as to include the derived filter information as a new candidate filter information in the filter bank.

2. The filtering method of claim 1, wherein the step of selecting the current filter information further comprises a step of:
    selecting the current filter information among of the derived filter information and the candidate filter information based on a rate-distortion (RD) cost when the candidate filter information in the filter bank has the filter shape and the image characteristics identical with the filter shape and the image characteristics of the derived filter information.

3. The filtering method of claim 2, wherein each of the derived filter information and the candidate filter information further includes a frame number and a filter coefficient.

4. The filtering method of claim 1, further comprising a step of transmitting encoded the filter index information to a decoder when the current filter information is selected as the candidate filter information.

5. The filtering method of claim 4, further comprising steps of:
    transmitting a filter bank-available flag to the decoder at a sequence level, wherein the filter bank-available flag represents whether the filter bank is available or not; and
    transmitting a filter type flag at a coding unit (CU) level when a value of the filter bank-available flag indicates 1, wherein the filter type flag represents whether the candidate filter information in the filter bank is used,
    wherein the filter index information is transmitted when a value of the filter type flag indicates 1.

6. The filtering method of claim 1, further comprising a step of transmitting encoded the explicit filter information to decoder when the current filter information is selected as the derived filter information.

7. The filtering method of claim 6, wherein the candidate filter information is substituted with the derived filter information.

8. A method of filtering a reconstructed picture, the method being performed by a decoding apparatus and comprising steps of:
receiving a filter type flag representing whether the candidate filter information in a filter bank is used;
selecting current filter information among derived filter information and the candidate filter information based on the filter type flag, wherein the derived filter information is derived for a target region; and
performing filtering on the target region within the reconstructed picture based on the current filter information,
wherein the current filter information is selected based on determination as to whether the candidate filter information has a filter shape and image characteristics identical with a filter shape and image characteristics of the derived filter information is present in the filter bank,
wherein the filter information has image characteristics of samples within the target region,
wherein the image characteristics includes information of activity and direction,
wherein the information of activity and direction are derived based on at least one of a degree of a change of sample values in horizontal direction, a degree of a change of sample values in vertical direction, and a degree of a change of sample values in diagonal direction within the target region,
wherein when the candidate filter information in the filter bank has the filter shape and the image characteristics identical with the filter shape and the image characteristics of the derived filter information, filter index information representing the candidate filter information in the filter bank is received, and the current filter information is selected in the filter bank based on the filter index information, and
wherein when there is no candidate filter information in the filter bank that has the filter shape and the image characteristics identical with the filter shape and the image characteristics of the derived filter information, explicit filter information specifying the derived filter information is received, the current filter information is selected based on the explicit filter information, and the filter bank is updated as to include the derived filter information as a new candidate filter information in the filter bank.

9. The filtering method of claim 8, further comprising a step of receiving a filter bank-available flag at a sequence level, wherein the filter bank-available flag represents whether the filter bank is available or not,
wherein the filter type flag is received at a coding unit (CU) level when a value of the filter bank-available flag indicates 1.

10. The filtering method of claim 8, wherein:
the explicit filter information is received when a value of the filter type flag indicates 0, and
the candidate filter information included in the filter bank is substituted with the derived filter information.

11. The filtering method of claim 8, wherein the reconstructed picture is a reconstructed picture after deblocking filtering or a sample adaptive offset (SAO) procedure has been completed.

* * * * *